United States Patent [19]

McFarlin et al.

[11] Patent Number: 4,870,827
[45] Date of Patent: Oct. 3, 1989

[54] HYBRID COMPOSITE COMPRESSOR

[75] Inventors: David J. McFarlin, Ellington; Antonio B. Caruolo, Vernon; Eric Minford, South Windsor; Karl M. Prewo, Vernon, all of Conn.

[73] Assignee: United Technologies, Hartford, Conn.

[21] Appl. No.: 84,370

[22] Filed: Aug. 12, 1987

[51] Int. Cl.[4] ............................................. F25B 9/00
[52] U.S. Cl. ................................................ 62/6; 62/498; 417/DIG. 1; 418/152
[58] Field of Search ............... 62/6, 498; 417/DIG. 1; 418/152

[56] References Cited

U.S. PATENT DOCUMENTS

| | | | |
|---|---|---|---|
| 3,419,208 | 12/1968 | Brewer et al. | 418/152 |
| 3,496,720 | 2/1970 | Neelen et al. | 62/6 |
| 4,086,043 | 4/1978 | Howe | 418/152 |
| 4,209,286 | 6/1980 | Schwartz | 418/152 |
| 4,263,367 | 4/1981 | Prewo | 428/338 |
| 4,265,968 | 5/1981 | Prewo | 428/336 |
| 4,341,826 | 7/1982 | Prewo et al. | 428/35 |
| 4,362,480 | 12/1982 | Suzuki et al. | 418/152 |
| 4,384,828 | 5/1983 | Rembold et al. | 418/152 |
| 4,403,478 | 9/1983 | Robbins | 62/6 |
| 4,428,763 | 1/1984 | Layden | 65/4.21 |
| 4,435,455 | 3/1984 | Prewo et al. | 428/36 |
| 4,464,192 | 7/1984 | Layden et al. | 65/18.1 |
| 4,466,785 | 8/1984 | Biswas | 418/152 |
| 4,475,346 | 9/1984 | Young et al. | 62/6 |
| 4,509,906 | 4/1985 | Hattori et al. | 418/152 |

Primary Examiner—Ronald C. Capossela
Attorney, Agent, or Firm—Kevin E. McVeigh

[57] ABSTRACT

A durable low weight compressor having improved performance is disclosed. The compressor includes a fiber reinforced resin matrix composite housing and a fiber reinforced glass marix composite compression chamber liner. An air conditioner including an improved compressor is also disclosed.

18 Claims, 3 Drawing Sheets

HYBRID COMPOSITE COMPRESSOR

TECHNICAL FIELD

The technical field to which this invention pertains is compressors.

BACKGROUND ART

Air conditioning equipment is widely used to treat air so as to control its temperature and humidity to meet the requirements of a confined space. While an air conditioning system typically comprises at least a refrigeration system, a control system and a fan, more elaborate systems may also include heating systems, humidity control systems and air filtration systems. The refrigeration system typically comprises a compressor, a condensor, an expansion valve and an evaporator.

Increases in the performance of air conditioning units are highly desirable. It is also desirable, particularly in regard to self-contained air conditioning units, such as automobile or room air conditioners, to reduce the weight of the air conditioner units.

The compressor typically accounts for most of the power consumption and a large fraction of the weight of an air conditioning unit. Improvement of the performance and reduction of the weight of a compressor can thus have dramatic effects on the efficiency and on the weight of the air conditioner unit of which the compressor is a part.

The performance and weight of conventional compressors are limited by the properties of the materials of construction. The high thermal conductivity of conventional metal compressors typically gives rise to an inefficiency in the compression cycle in that a portion of the heat generated by the compression of the working fluid is transferred from the compressed fluid through the compressor housing to the incoming fluid, thus raising the temperature of the incoming fluid. The high density of metal components increases the weight of the compressor. The high friction coefficient, high coefficient of thermal expansion, and limited wear resistance of metal components each have detrimental effects on the durability of the compressor.

What is needed in this art is a refrigerant compressor which overcomes the limitations discussed above.

DISCLOSURE OF THE INVENTION

An improved compressor is disclosed. The compressor comprises a fiber reinforced resin matrix housing with a noncompliant fiber reinforced glass matrix composite liner.

A further aspect of the disclosure involves an improved air conditioner which includes the improved compressor discussed above.

The foregoing and other features and advantages of the present invention will become more apparent from the following description and accompanying drawings.

BEST MODE FOR CARRYING OUT THE INVENTION

Figure 1:
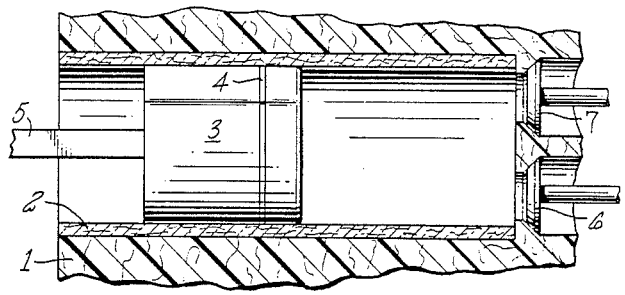
FIG. 1 shows a cross-sectional view of a reciprocating compressor.
Figure 2:
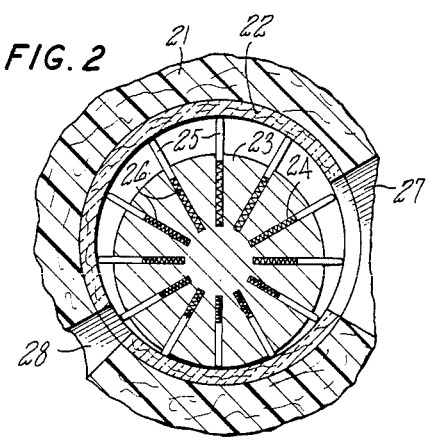
FIG. 2 shows a cross-sectional view of a sliding-vane rotary compressor.
Figure 3:
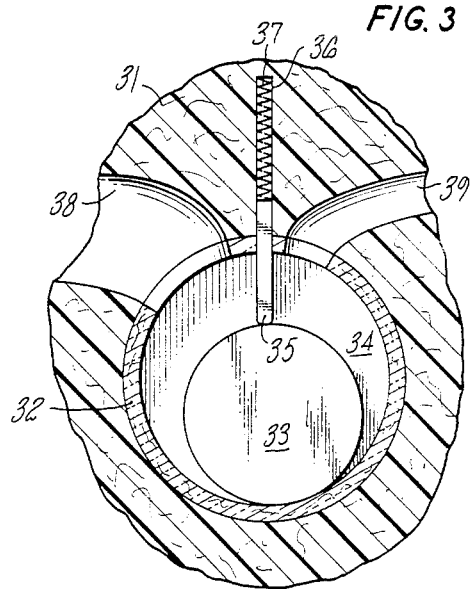
FIG. 3 shows a cross-sectional view of a fixed-vane rotary compressor.

The housing may be of any convenient configuration having a substantially continuous inner surface, such as, for example, a housing having a cylindrical bore. The liner may be of any convenient configuration having an outer surface that conforms to the inner surface of the housing and having a substantially continuous inner surface, such as, for example, a hollow tube. The liner covers the inner surface of the housing and the outer surface of the liner is rigidly attached to the inner surface of the housing. The liner is coextensive with the inner surface of the housing in that discontinuities in the inner surface of the housing, such as intake and exhaust ports, are not covered by the liner. The inner surface of the liner defines a compression chamber. The compressive means may be any means received with the compression chamber, and movable relative to the compression chamber (e.g. a piston) that is adapted for compressing a fluid in the compression chamber. FIGS. 1, 2 and 3 provide examples of several types of compressors.

FIG. 1 shows a cross-sectional view of an exemplary reciprocating compressor of the present invention. A tubular noncompliant fiber reinforced glass matrix cylinder liner (2) is rigidly attached to the inner surface of a cylindrical bore in the fiber reinforced resin matrix housing (1). A piston (3) is received within the tubular liner. A piston ring (4) contacts the inner surface of the liner (2) to provide a seal. The piston is connected to a means for reciprocally moving the piston by a connecting rod (5). The intake valve (6) opens on the piston downstroke, allowing low pressure gas to enter the cylinder, on the piston upstroke the intake valve (6) closes and the discharge valve (7) opens to discharge the gas at an elevated pressure.

FIG. 2 shows a cross-sectional view of an exemplary sliding-vane rotary compressor of the present invention. A noncompliant fiber reinforced glass matrix composite liner (22) is rigidly attached to the inner surface of the cylindrical bore of the fiber reinforced resin matrix composite housing (21). A rotor (23) is eccentrically mounted in the compression chamber. Vanes (25) are slidably received in an array of radially symmetrical longitudinal slots (24). The slots extend from the outer surface of the rotor toward the central axis of the rotor. A resilient means, such as a spring (26), urges each vane from its slot to contact the inner surface of the liner (22). In operation, the rotor is rotated on its axis and low pressure gas enters the inlet (27), is compressed as it is swept toward the discharge port (28) and discharged at an elevated pressure.

FIG. 3 shows a cross-sectional view of an exemplary fixed-vane rotary compressor of the present invention. A noncompliant fiber reinforced glass matrix composite compression chamber liner (32) is rigidly attached to the inner wall of the housing (31). A rotor means (34) is received within the compression chamber and forms a planar boundary for the compression chamber at normal to the longitudinal axis of inner surface of the liner. A cylindrical projection (33) is eccentrically mounted on the rotor means (34). A vane (35) is slidably received in a slot (36) in the housing (31). The vane (35) is urged by resilient means (37) to contact the surface of the projection (33). In operation, the rotor is rotated on its central axis, the projection (33) sweeps along the inner circumference of the liner (32) and the working fluid enters the intake port (38) at ambient pressure and is displaced by the projection and expelled from the discharge port (39) at an elevated pressure.

The glass matrix material of the liner may be any glass or glass-ceramic that imparts the desired high strength, thermal stability and abrasion resistance to the glass matrix composite liner of the present invention. Aluminosilicate, borosilicate and high silica glasses as well as mixtures of glasses are suitable matrix materials. Glass-ceramic materials (e.g. lithium aluminosilicate) may also be used as the glass matrix material. Borosilicate glass is preferred as the glass matrix material because it is more easily processed than the other lasses and its thermal stability is adequate for purposes of the present invention. A borosilicate glass, known as Corning 7740, has been found to be particularly well suited to the practice of the present invention. The Corning 7740 glass has a tensile modulus of $9.1 \times 10^6$ psi, a density of 2.23 g/cm$^3$, a coefficient of thermal expansion of $32.5 \times 10^{-7}$ cm/cm° C., an anneal point of 560° C., a softening point of 821° C. and a liquidus temperature of 1017° C.

The fiber reinforcement in the glass matrix composite liner of the present invention may comprise any discontinuous fiber that exhibits a tensile strength greater than $200 \times 10^3$ psi, a tensile modulus greater than $30 \times 10^6$ psi, is stable at temperatures up to 1400° C., and imparts lubricity to the glass matrix composite liner.

Pitch or polyacrylonitrile (PAN) based carbon fibers are preferred. PAN carbon fibers are most preferred because they impart superior lubricity. A PAN carbon fiber, known as HMU, manufactured by Hercules Corp., has been found to be particularly well suited to the practice of the present invention.

A fiber reinforced glass matrix composite liner may be formed by injection molding a mixture of discontinuous fibers and glass powder as described in commonly assigned U.S. Pat. No. 4,464,192, the disclosure of which is incorporated herein by reference.

The volume fraction of fiber may range from about 10% to about 50%. A volume fraction of fiber above about 50% results in a deterioration of the wear resistance of the liner due to fiber pullout. It is preferred that the volume fraction of fiber reinforcement in the glass matrix be in the range of about 30% to about 40%.

The resin matrix of the fiber reinforced resin matrix composite housing of the present invention is chosen to impart high strength and thermal stability. Polyamide resins, bismaleiimide resins and polyphenylene sulfide resins are suitable resin materials.

Polyphenylene sulfide resins are a cost effective choice for applications in which long term exposure to temperatures above about 175° C. is not anticipated and are preferred for such applications. A glass filled polyphenylene sulfide resin known as Ryton ® A-100, manufactured by Phillips Petroleum, was found to be suitable in the practice of the present invention. According to the manufacturer's literature, Ryton ® A-100 has a flexural modulus of $1.7 \times 10^6$ psi at 100° F., a tensile strength of $1.8 \times 10^3$ psi at 100° F. and a density of 1.66 g/cm$^3$. Ryton ® A-100 polyphenylene sulfide resin contains about 40 weight percent chopped glass fibers, so that it may not be necessary to add fibers to the Ryton ® A-100 resin to obtain a suitable fiber reinforced resin matrix composite material.

For applications in which resistance to temperatures above about 175° C. is required, polyimide resins are preferred. A polyimide resin known as PMR-15, available from CTL-Dixie, Inc., would be suitable for such applications. The PMR-15 resin has a tensile modulus of $0.65 \times 10^6$ psi, a tensile strength of $7 \times 10^3$ psi, a density of 1.30 g/cm$^3$, and a heat deflection temperature of 330° C.

Any discontinuous fiber reinforcement that exhibits tensile strength greater than $10 \times 10^3$ psi, modulus greater than $10 \times 10^6$ psi, thermal stability up to 700° C., and is wettable by the resin is suitable material for the fiber reinforcement of the resin matrix. Chopped glass fibers and discontinuous graphite fibers are preferred.

The fiber reinforced resin matrix housing may be formed by conventional injection molding techniques. It is preferred that the fiber reinforcement comprise a volume fraction between about 20% and about 60%, with a range of about 35% to about 45% being most preferred.

A preferred method for forming the fiber reinforced resin matrix composite housing is the molding process described in commonly assigned copending application Ser. No. 07/084,368, filed Aug. 12, 1987, entitled "Hybrid Composite Structures of Fiber Reinforced Glass and Resin Matrices", the disclosure of which is incorporated herein by reference. Briefly, the process involves molding a mass of fiber-containing uncured resin in contact with a preconsolidated glass matrix composite and curing the resin to consolidate a fiber reinforced resin matrix composite structure and simultaneously bond the resin matrix composite structure to the glass matrix composite structure.

Prior to forming the hybrid composite article, the surface of the preconsolidated glass matrix composite structure is pretreated to promote the adhesion of the resin matrix composite structure to the surface. Pretreatment of the surface may comprise cleaning or degreasing the surface or roughening the surface. The surface may be cleaned or degreased by, for example, contacting the surface with liquid solvent or solvent vapors. Conventional solvents, such as chlorinated solvents, are suitable. The surface may be roughened by, for example, sandblasting or chemical etching. Roughening and cleaning treatments may also be combined, such as sandblasting followed by solvent cleaning.

A preferred technique for roughening the surface of the glass matrix structure comprises leaching back the glass matrix to partially expose the underlying fiber reinforcement by contacting the surface with an acid or base solution. This technique improves adhesion because the partially exposed fibers at what is to eventually comprise the glass matrix/resin matrix interface will ultimately be bonded into both matrices. Contacting the surface with a hydrofluoric acid solution for a time period between about 10 seconds and about 1 minute is a particularly effective chemical etching treatment. The most preferred pretreatment method is leaching back the glass matrix to partially expose the fiber reinforcement by immersing the preconsolidated glass matrix composite structure in concentrated hydrofluoric acid for a time period of about 10 seconds to about 20 seconds, removing the structure from the acid bath, and rinsing the surface with water.

It should be noted that the structural integrity of the hybrid composite article may also be improved by providing the glass matrix composite structure with a geometrically complex surface to provide for mechanical interlocking between the glass matrix and resin matrix regions of the hybrid composite article.

A hybrid composite article according to the present invention is formed by molding and curing a mass of fiber-containing resin in contact with a preconsolidated fiber reinforced glass matrix composite structure. The mass of fiber-containing resin is molded and cured by conventional processes which differ according to the particular choice of resin and according to the particular size and shape of the molded structure. The high temperature resistance and low thermal expansion of the preconsolidated glass matrix composite structure make the glass matrix structure amenable to a reinforced resin molding process. The curing of the resin matrix consolidates the resin matrix composite and simultaneously forms an integral bond between the resin matrix composite and the glass matrix composite to form the hybrid composite article.

A hybrid composite article according to the present invention may be formed, for example, by placing one or more preconsolidated glass matrix structures in a predetermined orientation within a mold die into which a fiber reinforced resin is injected and cured.

Although the article of the present invention has been described in terms of a preferred fabrication process, it should be understood that other fabrication processes, such as bonding a preconsolidated fiber reinforced glass matrix cylinder liner into a preconsolidated fiber reinforced resin matrix housing, may alternatively be employed.

Figure 4:
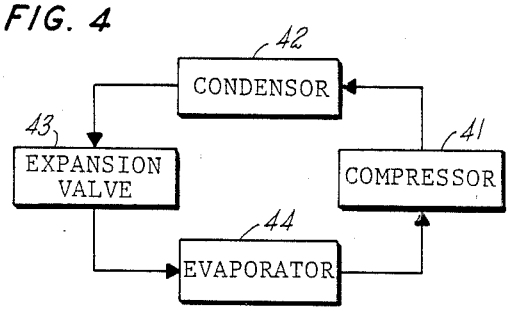
FIG. 4 shows a schematic diagram of a refrigeration unit.

The air conditioner of the present invention is an air conditioner which includes a compressor of the present invention. FIG. 4 shows a schematic diagram of a refrigeration system. A refrigerant fluid, such as a fluorochlorocarbon, serves as the working fluid. The refrigerant is compressed in the compressor (41) and the compressed fluid flows to the condensor (42) for cooling. The cooled compressed fluid flows from the condensor (42) to the expansion valve (43) where the fluid is further cooled by rapid expansion. The cold fluid flows from the expansion valve (43) to the evaporator (44) where heat is exchanged between the air to be cooled and the cold refrigerant. Cooled air and warmed refrigerant exit the evaporator (44). The refrigerant is returned to the condensor (41) to complete the cycle.

EXAMPLE I

Samples of fiber reinforced glass matrix composite were prepared using the injection molding procedure described in U.S. Pat. No. 4,464,192. The samples comprised 35 percent by volume of discontinuous graphite fiber (HMU, Hercules Inc.) and 65 percent by volume glass matrix (Corning 7740, Corning Glass Works). The material so prepared was characterized by a series of tests.

The mechanical properties of the fiber reinforced glass matrix composite material are listed in the Table.

TABLE

| | |
|---|---|
| in-plane flexural strength | 30 ksi |
| in-plane flexural modulus | 6 Msi |
| through-plane flexural strength | 4 ksi |
| through-thickness tensile strength | 1.5 ksi |

Figure 5:
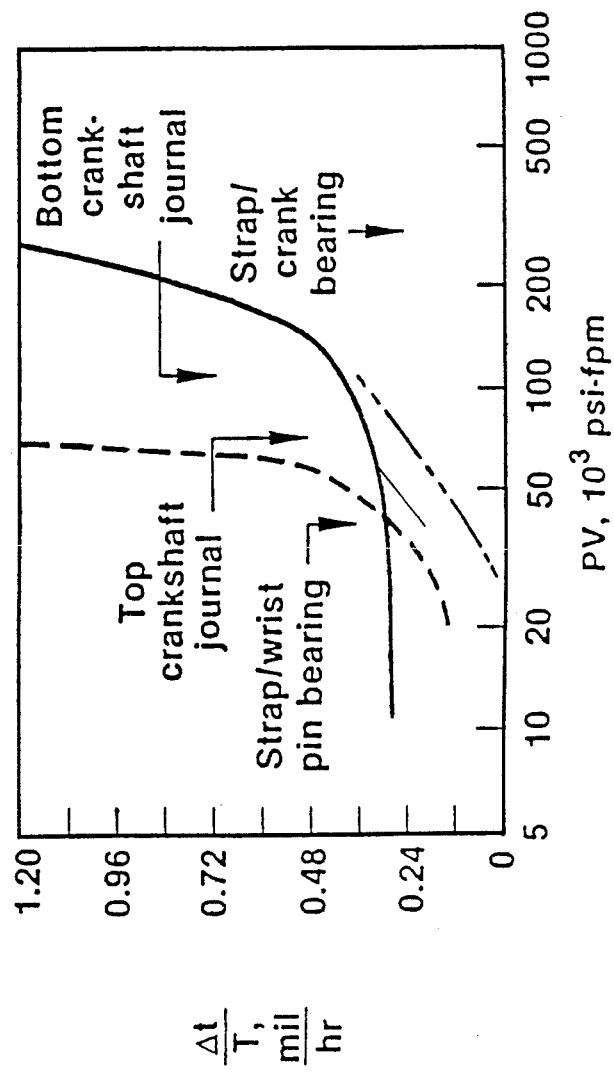
FIG. 5 compares wear rate versus work for several pairs of materials.

The results of pin-on-disk wear testing for several pairs of materials including a Vespel TM SP-21 pin on a fiber reinforced glass matrix disk are presented in FIG. 5. The results clearly indicate the lower wear rate of the glass matrix composite.

Figure 6:
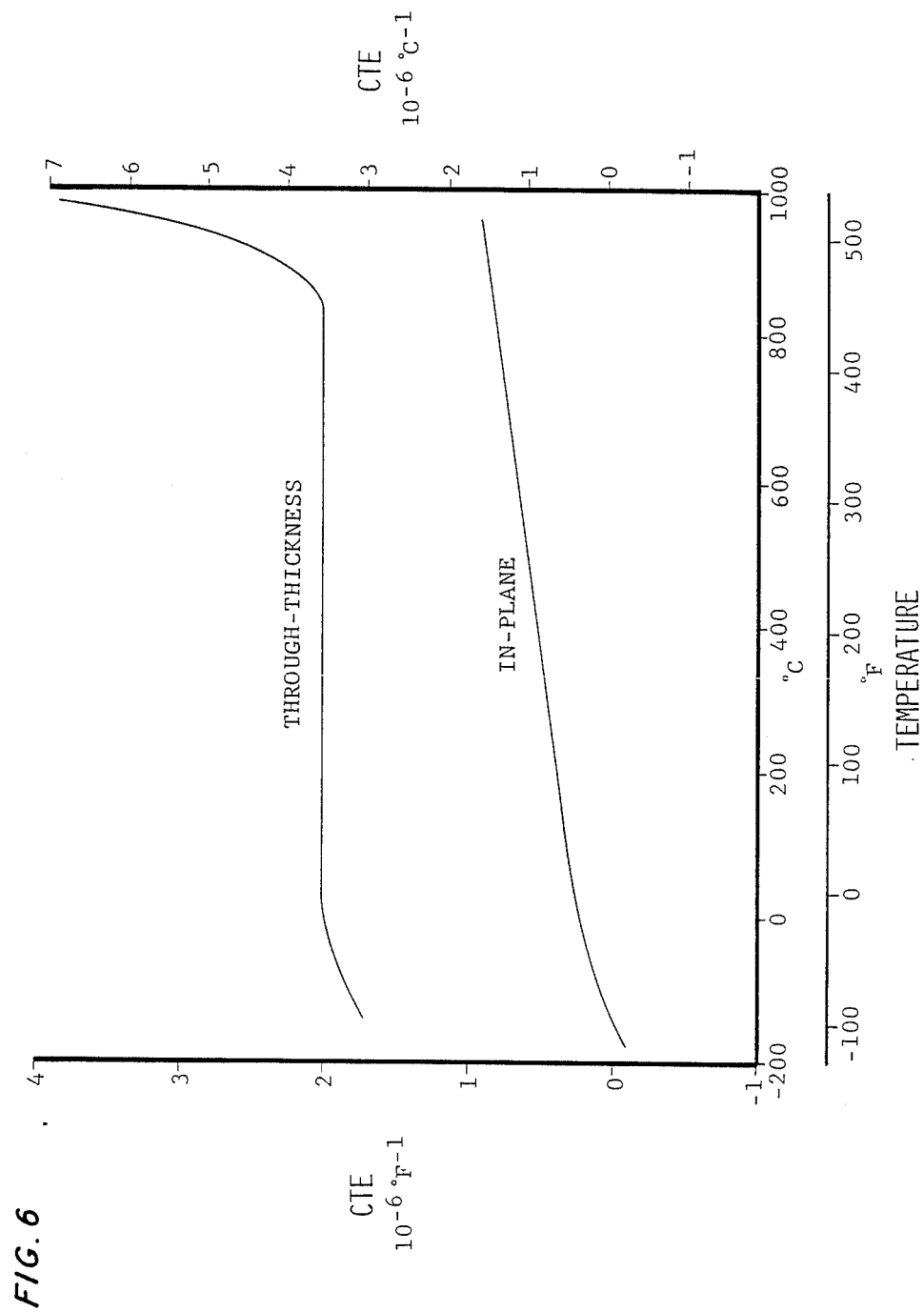
FIG. 6 shows coefficient of thermal expansion for the fiber reinforced glass matrix composite liner of the present invention versus temperature.

The in-plane and through-thickness coefficients of thermal expansion for the glass matrix composite are presented in FIG. 6. It should be noted that the two coefficients are both relatively low and relatively constant over a very wide temperature range.

The combination of a fiber reinforced resin matrix composite housing with a noncompliant fiber reinforced glass matrix liner provides advantages over the conventional art in several ways. The assembly exhibits a much lower density then analogous metal assemblies. The low thermal conductivities of the glass matrix liner and of the resin matrix housing reduce heating of the incoming working fluid and improve compressor performance. The glass matrix liner offers a low coefficient of thermal expansion which permits maintenance of closer tolerances than possible with steel liners. The glass matrix liner provides a smoother, lower friction surface than steel liners and provides improved wear resistance. These advantages find application in improved low weight, high performance refrigeration compressors and air conditioning systems.

Although this invention has been shown and described with respect to detailed embodiments thereof, it will be understood by those skilled in the art that various changes in form and detail thereof may be made without departing from the spirit and scope of the claimed invention.

We claim:

1. A compressor, comprising:
   a housing having a substantially continuous first inner surface, said first inner surface defining a compression chamber, and
   a compressive means, movably received within said compression chamber, for compressing a fluid,
   wherein the improvement comprises using as the housing a fiber reinforced resin matrix composite housing having a noncompliant fiber reinforced glass or glass-ceramic matrix composite liner, said liner having an outer surface and a substantially continuous second inner surface, said outer surface being rigidly attached to said first inner surface of the housing, and said second inner surface defining a compression chamber, resulting in a durable, low weight compressor having improved performance.

2. The compressor of claim 1, wherein the compressive means comprises a piston.

3. The compressor of claim 1, wherein the compressive means comprises a cylindrical rotor eccentrically mounted in the compression chamber, said rotor having an array of vanes slidably received in an array of longitudinal slots.

4. The compressor of claim 1, wherein the housing has a longitudinal slot radiating outward from the second inner surface and said compressive means comprises a vane slidably received within the longitudinal slot, a rotor, rotably received within the compression chamber, a cylindrical projection, eccentrically mounted on said rotor, and a resilient means urging the vane to contact the projection.

5. The compressor of claim 1 wherein the fiber reinforcement fiber reinforced resin matrix composite comprises chopped glass fibers.

6. The compressor of claim 1 wherein the resin matrix comprises a polyphenylene sulfide resin.

7. The compressor of claim 1 wherein the resin matrix comprises a polyimide resin.

8. The compressor of claim 1 wherein the fiber reinforcement of the fiber reinforced glass or glass-ceramic matrix composite comprises graphite fibers.

9. The compressor of claim 1 wherein the glass or glass-ceramic matrix comprises a borosilicate glass.

10. An air conditioner, comprising:
a compressor, in flow connection with
a condensor, in flow connection with
an expansion valve, in flow connection with
an evaporator, in flow connection with said compressor,
said compressor comprising:
a housing having a substantially continuous first inner surface, said first inner surface defining a compression chamber, and
a compressive means, movably received within said compression chamber, for compressing a fluid,
wherein the improvement comprises using as the housing a fiber reinforced resin matrix composite housing having a noncompliant fiber reinforced glass or glass-ceramic matrix composite liner, said liner having an outer surface and a substantially continuous second inner surface, said outer surface being rigidly attached to said first inner surface, and said second inner surface defining a compression chamber, resulting in a low weight air conditioner having improved performance.

11. The air conditioner of claim 10 wherein the compressive means comprises a piston.

12. The air conditioner of claim 10 wherein the compressive means comprises a cylindrical rotor eccentrically mounted in the compression chamber, said rotor having an array of vanes slidably received in an array of longitudinal slots.

13. The air conditioner of claim 10 wherein the housing has a longitudinal slot radiating outward from the second inner surface and said compressive means comprises a vane slidably received within the longitudinal slot, a rotor, rotably received within the compression chamber, a cylindrical projection, eccentrically mounted on said rotor, and a resilient means urging the vane to contact the projection.

14. The air conditioner of claim 10 wherein the fiber reinforcement fiber reinforced resin matrix composite comprises chopped glass fibers.

15. The air conditioner of claim 10 wherein the resin matrix comprises a polyphenylene sulfide resin.

16. The air conditioner of claim 10 wherein the resin matrix comprises a polyimide resin.

17. The air conditioner of claim 10 wherein the fiber reinforcement of the fiber reinforced glass or glass-ceramic matrix composite comprises graphite fibers.

18. The air conditioner of claim 10 where the glass or glass-ceramic matrix comprises a borosilicate glass.

* * * * *